United States Patent

Ban

[15] 3,661,395

[45] May 9, 1972

[54] MAGNETIC TAPE FAST FEED CONTROL APPARATUS

[72] Inventor: Itsuki Ban, 829 Higashi-Oizumimachi Nerima-ku, Tokyo, Japan

[22] Filed: May 5, 1970

[21] Appl. No.: 34,736

[30] Foreign Application Priority Data

May 8, 1969 Japan....................................44/34785

[52] U.S. Cl. ..........................274/4 B, 179/100.2 Z, 226/178, 242/55.19 A, 274/4 D, 274/4 A

[51] Int. Cl.....................G11b 5/54, B65h 17/20, B65h 17/48

[58] Field of Search.................242/55.19 A, 55.19, 197, 198; 274/4 D, 4 B, 4 F, 4 G, 4 C, 11 B, 11 C, 11 D; 179/100.2 Z; 226/178

[56] References Cited

UNITED STATES PATENTS

| | | | |
|---|---|---|---|
| 2,898,409 | 8/1959 | Tiger | 242/55.19 A X |
| 3,009,024 | 11/1961 | Eash | 179/100.2 Z |
| 3,478,973 | 11/1969 | Lear et al. | 242/55.19 A |
| 3,561,767 | 2/1971 | Negishi | 274/4 G |

*Primary Examiner*—Billy S. Taylor
*Attorney*—Jacobs & Jacobs

[57] ABSTRACT

An endless tape cartridge is insertable on the deck of a recording and reproducing device provided with a normal drive speed and timed fast forward speed. The device drives the tape by a capstan driven by a motor rotatable at either a fast or low speed and having large and small driving pulleys either of which is connected by a drive belt to the flywheel of the capstan. To advance the tape rapidly, the fast forward drive is actuated by control curcuitry including a timer operated switch which actuates a solenoid to in turn pivot a belt shifting lever to move the belt from the small to the large diameter pulley and to simultaneously electrically operate the motor at a fast speed. An associated stopper lever latches the belt shifting lever in its fast position while suitable linkage pivots the device's magnetic head clear of the tape. The fast forward operation continues until the timer operated switch actuates curcuitry controlling a release lever which is connected through suitable linkage to shift the stopper lever to allow the belt shifting lever to return the belt and motor speed back to the normal, lower speed.

6 Claims, 3 Drawing Figures

MAGNETIC TAPE FAST FEED CONTROL APPARATUS

BACKGROUND OF THE INVENTION

This invention relates to a magnetic tape fast feed control apparatus for an endless magnetic tape cartridge player.

In general, in an endless magnetic tape cartridge player, when it is desired to change drive of the tape from the normal playing speed to the fast speed, it is customarily to increase rotation of a capstan for driving the tape. To this end, it has been proposed to change the reduction ratio of a belt drive device when the capstan is belt driven by the motor or change the rotational speed of the motor. These approaches encounter with a technical problem if the rotational speed of the capstan may be increased by eight times or more. Particularly, in changing the reduction ratio of the belt drive device the belt must be shifted from a small drive pulley to a large drive pulley of diameter eight times as large as that of the small drive pulley. This requires the belt to expand more than limitation thereof, and in practical use, it is impossible to do so.

The inventor has succeeded in that rotation of the capstan is increased by increasing of the rotational speed of the motor simultaneously with shifting the belt whereby the tape may be driven at speed eight times as fast as the normal playing speed. Change in rotation of the capstan from fast speed to low speed for feeding the magnetic tape at normal speed varied from fast speed, is attended with a shortcoming that the backlash of the tape is occasioned by the capstan since the tape driven at fast speed is caused to overrun due to inertia. This is particularly with the case such that the tape is driven at faster speed. The inventor has also succeeded in overcoming such defect by interruption of the drive of the tape when the tape feed speed is changed from fast to low one, which reduces the running speed of the tape due to inertia to again drive the tape.

Further, abrasion of the magnetic head is experienced in engagement with the tape when the tape driven at fast speed engages the magnetic head adapted to transduce the tape. Accordingly, it is necessary to move the magnetic head to a position where it is not engaged with the tape when driven at fast speed.

SUMMARY OF THE INVENTION

It is a primary object of the invention to provide a magnetic tape fast feed control apparatus for an endless magnetic tape cartridge player, wherein rotation of a capstan is changed from fast or low and vice versa whereby the tape is fed either at normal or fast speed as the case may be.

Another object of the invention is to provide a magnetic tape fast feed control apparatus for an endless magnetic tape cartridge player, a motor for driving the capstan is adapted and large drive pulleys connected to the output shaft of the motor is selectively imparted through a belt and a flywheel attached to the capstan to the capstan, when the belt is trained to the small drive pulley the motor is rotated at low speed while the tape is driven at normal playing speed by the capstan whereas the belt is trained to the large drive pulley the motor is rotated at fast speed to drive the tape at fast speed by the capstan.

Still another object of the invention is to provide a magnetic tape fast feed control apparatus for an endless magnetic tape cartridge player, comprising shift means for moving the belt to selectively train the belt to the small drive pulley or the large drive pulley, and a changing switch coactable with the shift means to change the rotational speed of the motor whereby the running speed of the tape may be properly changed from the normal playing speed to the fast speed and vice versa by controlling operation of the shift means.

Yet another object of the invention is to provide a magnetic tape fast feed control apparatus for an endless magnetic tape cartridge player, wherein the tape drive made by the capstan is temporarily interrupted when rotation of the capstan is changed from fast speed to low speed, and thus the running speed of the tape fast fed is reduced and thereafter the tape is again driven by the capstan to prevent backlash of the tape for the capstan due to overruning of the tape.

A further object of the invention is to provide a magnetic tape fast feed control apparatus for an endless magnetic tape cartridge player, wherein the magnetic head is moved from a transduce position to a non-transduce position simultaneously with fast feeding of the tape, during fast feeding of the tape is slidably engaged with the magnetic head and abrasion of the magnetic head due to the tape is entirely prevented.

Another object of the invention is to provide a magnetic tape fast feed control apparatus for an endless magnetic tape cartridge player, wherein the tape is fast fed by predetermined quantity and thereafter the shift means is automatically returned to a condition that the belt is trained to the small drive pulley to interrupt the fast feed of the tape thereby changing to normal feed thereof.

These and other objects and advantages of the invention will be apparently understood from the following description as to preferred embodiments by reference to the accompanying drawings:

DESCRIPTION OF THE PREFERRED EMBODIMENTS

Figure 1:
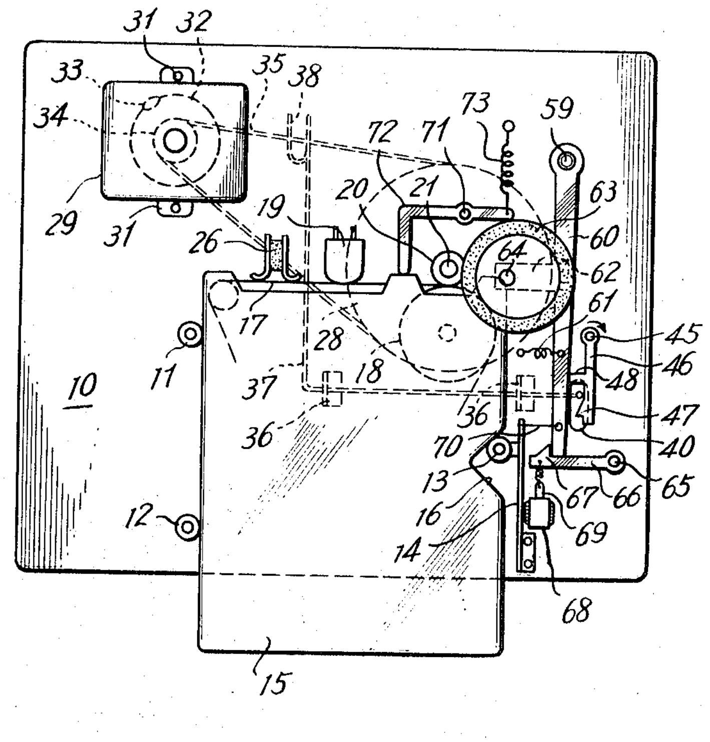
FIG. 1 is a representation schematically showing an endless magnetic tape cartridge player to which one embodiment of an apparatus of the invention is applied.

Referring now to the drawings, and in particularly to FIG. 1, the reference numeral 10 designates a horizontal player deck within a player housing (not shown) for an endless magnetic tape cartridge player. The deck 10 is provided with a way for an endless magnetic cartridge 15 thereon. Guide members 11, 12, and 13 are mounted on the deck 15 for holding the magnetic cartridge in the play position. The guide member or retention roller 13 is provided on a leaf spring 14 one end of which is mounted on the deck 10, and is pressed into a notch 16 on the side of the cartridge 15. By pressing the retention roller 13 against the inclined wall of the notch 16 in the cartridge, a forward force is exerted upon the cartridge 15 and the cartridge 15 is held in the play position relative to a magnetic head 19 adapted to transduce the tape 17 within the cartridge 15 and a rotatary 20 for driving the tape. The cartridge 15 includes a generally rectangular housing which contains the endless magnetic tape 17 spirally wounded in conventional manner a rotatary pinch roller 18 for cooperating with the capstan to drive the tape.

Figure 3:
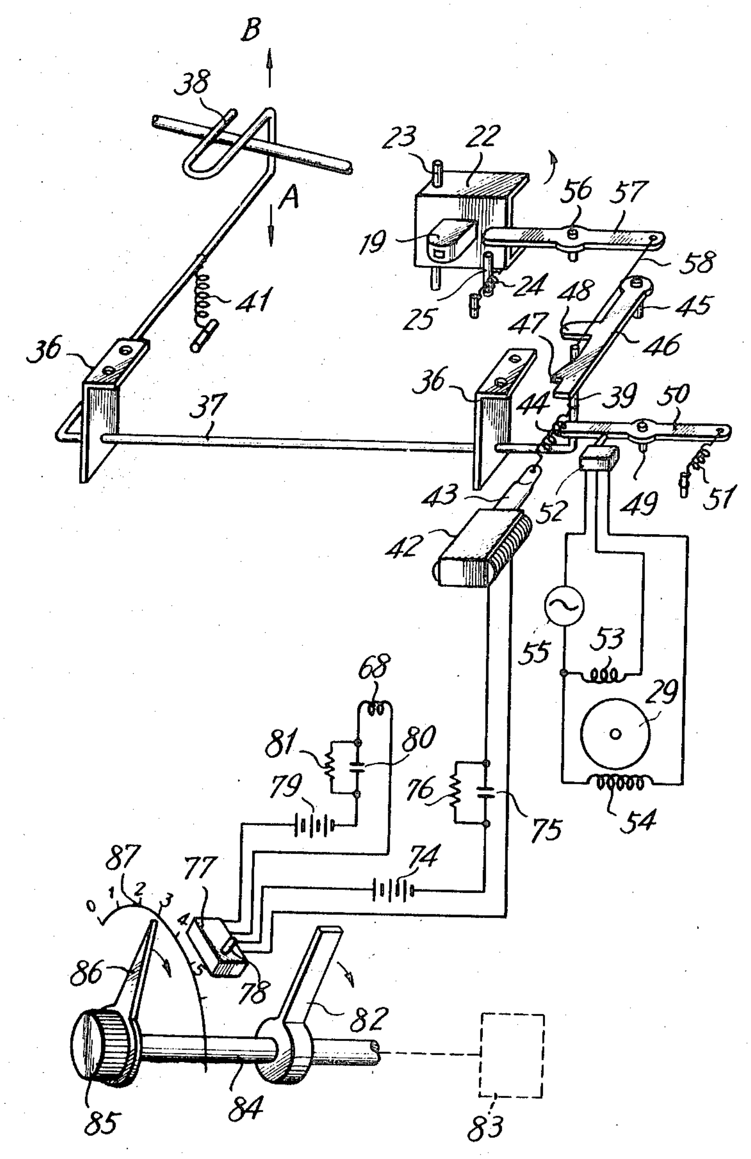
FIG. 3 is a representation showing a mechanism for selectively training the belt in FIG. 1 to either one of the pulleys and changing the rotational force of the motor.

As shown in FIG. 3, a displaceable support member 22 is swingably and slidably mounted to a guide pin 23 vertically provided on the deck. The magnetic head 19 is firmly secured to the displaceable support member 22. The displaceable support member 22 is moved up and down along the guide pin 23 by shift means (not shown as it does not take part of the invention). An endmark detector 26 formed of a pair of electrically separated feeler contacts is mounted on the deck 10. The shifting means is caused to move the displaceable support member by one step in response to passage of an endmark (not shown) of conductive foil on the tape over the endmark detector whereby the magnetic head 19 is located to play a plurality of dicrete and separate record-track. The support member 22 is clockwise biased by a spring 24, however, inward movement of the support member 22 due to the spring is limited by a stopper pin 25.

Figure 2:
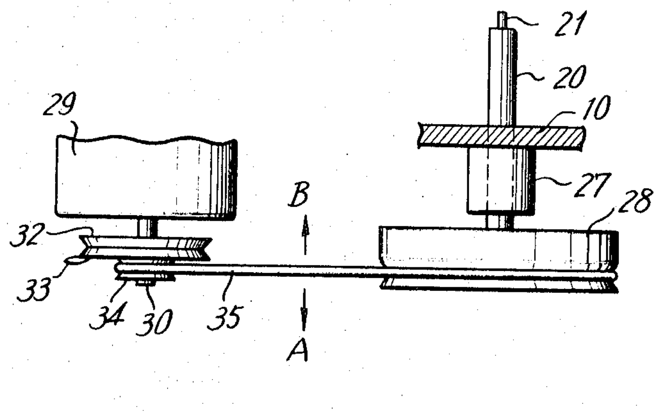
FIG. 2 is a front view showing a mechanical portion for imparting rotation of the output of the motor to the capstan as shown in FIG. 1.

The capstan 20 is rotatably mounted to a suitable bearing 27 (FIG. 2) underneath of the deck 10 and upwardly extends through a hole (not shown) bored through the deck. A reduced portion 21 is mounted to the capstan 20 at upper end thereof. The capstan 21 is adapted to cooperate with the pinch roller 18 of the cartridge 15 when the cartridge is urged into its play position. The capstan 20 may be driven at either of two different speeds with the apparatus in accordance with this invention. A flywheel 28 is attached to the capstan 20 at the lower end thereof.

A motor 29 for rotatably driving the capstan 20 passes through a hole (not shown) bored through the deck 10 and is mounted by mounts 31 to the deck 10. An output shaft 30 of the motor 29 projects from the motor body downwardly of the deck 10 and is provided with large and small drive pulleys 32 and 34 adjacent to each other. The large drive pulley 32 carries a projecting part 33 at the periphery thereof.

A belt 35 of resilient material such as rubber or the like is normally trained between the small drive pulley 34 and the flywheel 28. With this arrangement, rotation of the output shaft 30 is imparted through the small drive pulley 34, the belt 35, and the flywheel 28 to the capstan 21 to normally rotate the capstan at low speed whereby the tape 17 is driven at a predetermined playing drive speed. The detail of the belt shift means for selectively shifting the belt 35 to the pulley 34 or the pulley 32 will be described hereinafter by reference to FIG. 3.

The belt shift means includes an actuating member 37 suitably bent. The actuating member 37 of wire or the like is rotatably supported by a L-shaped supporters 36 mounted to the deck 10 thereunder. The actuating member 37 includes one end portion 38 so bent to embrace a portion of the belt 35, and the other end portion 39 upwardly extending through a longitudinal slot 40 on the deck 10. The actuating member 37 is biased by a spring 41 in the direction where the belt 35 is trained to the small drive pulley 34. The actuating member 37 is coupled by a connecting spring 44 to a plunger 43 for a solenoid 42 and is swung against the bias of the spring 41 when the solenoid 42 is energized. As the actuating member 37 is swung by the solenoid 42, the belt 35 is moved by the actuating member in the direction of arrow B and is shifted by the projecting part 33 from the small drive pulley 34 to the large drive pulley 32. The actuating member 37 swung by the solenoid 42 is prevented from returning by the bias of the spring 41 after the solenoid 42 has been energized upon engagement of the end portion with a projection 47 of a stopper lever 46 which is biased by a spring (not shown) in the direction of arrow as shown and pivoted to a pin 45 connected to the deck 10.

A lever 50 is pivoted to a pin 49 connected to the deck 10 thereunder normally engages at its one end the end portion 39 of the actuating member 37 under the influence of a spring 51. A changing switch 52 is mounted to the deck 10 thereunder for changing the rotational speed of the motor 29 and is adapted to be actuated by the lever 50 swingable in relation to swingable movement of the actuating member 37. The motor 29 in this instance is an induction motor available as double-pole and octorode and includes a double-pole coil 53 and octorode coil 54. The alternating current from a power source 55 is applied to the octorode coil 54 when the changing switch 52 is not operated by the lever 50 and the motor 29 is operated as the octorode motor, however, the alternating current from the power source 55 is applied to the bipolar coil 53 when the changing switch 52 is operated by the lever 50 swung against the bias of the spring 51 while the motor 29 is operated as the double-pole motor.

When the actuating member 37 is in a position where the belt 35 is trained to the small drive pulley, the motor 29 is operated as the octorode motor to rotate the output shaft 30 at low speed. At this moment, the capstan 20 is rotated at low speed to drive the tape 17 at normal play speed. On the other hand, the actuating member 37 is moved to a position where the belt 35 is trained to the large drive pulley 32, and the motor 29 is actuated as the double-pole motor to allow the output shaft 30 to rotate at speed four times as fast as before. In this instance, the ratio of the small and large pulleys is 1:2 so that rotation of the capstan 20 is increased by eight times than usual. Accordingly, the tape 17 is also driven at speed eight times as fast as the normal play speed. A lever 57 pivoted to a pin 56 mounted to the deck 10 and the end portion 39 of the actuating member 37 is connected by a string member 58. The lever 57 is its other end in engageable relationship with the supporter 22 of the magnetic head 19. The lever 57 is swung by the string member 58 when the actuating member 37 is swung by the solenoid 42 to thereby swing the supporter 22 against the bias of the spring 24. This allows the magnetic head 19 to move from a transduce position where the magnetic head slidably contact the tape into a non-transduce position where the magnetic head is not engaged with the tape 17. Therefore, the magnetic head 19 is caused to keep away from the tape when the tape 17 is driven at fast speed. This will serve that the magnetic head 19 will not be abrased even if the magnetic head 19 is run at fast speed.

Means for moving the stopper lever 46 to establish disengagement from the actuating member 37 includes a swing lever 60 one end of which is pivoted to a pin 59 mounted to the deck 10 and which is clockwise biased by a spring 61. The swing lever 60 is provided with an arm 62 projecting therefrom. A clearance between the arm 62 and the deck 10 is so dimensioned as not to interfere with the cartridge 15 to be located in the play position and is wider than the thickness of the cartridge 15. A rubber covered eccentric frictional idler wheel 63 is rotatably mounted to an axis 64. The idler wheel 63 is rotatably driven when it is engaged by the reduced portion 21 as will be described later. As shown in FIG. 1, the free end of the swing lever 60 engages a hook portion 67 of a hook lever 66 pivoted to a pin 65 connected to the deck and rotation of the swing lever 60 made by the spring 61 is retained. At this time, the wheel 63 is not rotated since abutment force against the capstan 20 has been diminished. The lever 66 is connected to a plunger 69 for a solenoid 68 fixed to the deck 10 and movable to establish disengagement from the swing lever 60 when the solenoid 68 is energized. Once such disengagement has been established, the swing lever 60 is slightly and clockwise swung by the bias of the spring 61, and the wheel 63 abuts against the reduced portion 21 of the capstan 20 under the influence of the spring 61 and is rotatably driven. Since, at this time, the wheel 63 is eccentrically rotated, the swing lever 60 is reciprocally swung in response to rotation of the wheel. When the wheel 63 is rotated through about one revolution, the swing lever 60 is again prevented from swing as it engages the hook lever 66 returned to its original position when the solenoid 68 has been energized whereby abutment force between the wheel 63 and the capstan 20 due to the spring 61 is diminished to allow the wheel 63 to stop its rotation at a point where the wheel is rotated through a turn from the original position. During the time that the wheel 63 makes initial half rotation, the swing lever 60 is counterclockwise swung. At this moment, the arm 48 of the stopper lever 46 is pressed by the swing lever 60, and the stopper lever 46 is moved to establish disengagement from the actuating lever 37. The leaf spring 14 is clockwise moved by a string member 70 when the swing lever 60 is counterclockwise swung. Clockwise movement of the leaf spring 14 diminishes a force by which the retention roller 13 presses the notch 16 of the cartridge 15, and the leading edge of the cartridge 15 is pressed by a pushing lever 72 which is counterclockwise biased by a spring 73 pivoted to a pin 71 on the deck. Thus, the cartridge is slightly moved back from the play position. As a result, abutment force of the pinch roller 18 against the capstan 20 is diminished to interrupt the drive of the tape. This tape may be fed decreasing its speed since there exists in inertia thereof.

During the time that the wheel 63 makes a half revolution in the latter stage, the swing lever 60 is clockwise and swingably swung to allow the retention roller 13 to press the notch 16 of the cartridge 15 whereby the latter is moved to a position where the pinch roller 18 abuts against the play position. During the time that the cartridge 15 is returned to the play position, the stopper lever 46 has been disengaged from the actuating lever 37 and the belt 35 is moved in the direction of arrow A and is trained to the small drive pulley 34 by the actuating lever 37 under the bias of the spring 41. With respect to restoration of the actuating lever 37, operation of the changing switch 52 made by the lever 50 is discontinued and the motor 29 is converted to a situation that it is operated as the octorode motor to rotate the capstan 20 at low speed. On the other hand, the supporter 22 of the magnetic head 19 is returned by the bias of the spring 24 and the magnetic head 19 is returned from the non-transduce position to the transduce position. Prior to change in rotational speed of the capstan 20 from fast to low one, the tape drive is temprorarily interrupted. If the pinch roller 18 abuts against the capstan 20, the backlash of the tape is not occasioned for the capstan since the capstan 20 has reduced its rotational speed. If not, the tape 17 in a spiral form driven at fast speed may be overrun by its inertia to thus produce the backlash for the capstan 20.

A control circuit for controlling operation of the solenoid 42 swinging the actuating member 37 is constituted so that a power source 74, a parallel connection of a condenser 75 with a high value resistor 76, and a switch 77 are respectively connected in series with the solenoid 42. Meanwhile, a control circuit for controlling operation of the solenoid 68 swinging the hook lever 66 is constituted so that a power source 79, a parallel connection of a condenser 80 with a high value resistor 81, and a switch 77 are connected in series with the solenoid 68. The switch 77 includes two sets of individual switch members (not shown) included the control circuit for the solenoid 42 and in the control circuit for the solenoid 68. The first switch member included in the first control circuit for the solenoid 42 is maintained in opened or closed condition when the actuator 78 of the switch is depressedly operated or not operated. On the Contrary, the second switch member included in the second control circuit for the solenoid 68 is maintained in closed or opened condition when the actuator 78 is operated or not operated. A lever 82 for operating the actuator 78 of the switch 77 is mounted a shaft 84 coupled to a conventional clockwork 83 indicated by the broken lines. The shaft 84 is provided with a knob 85 having a pointer 86. The pointer 86 is adapted to point digits such as numerals 0, 1, 2, 3 --- 5 on a dial plate 87 provided opposite to the pointer.

The shaft 84 is normally disposed to allow the pointer 86 to point the digit "0". At this moment, the lever 82 presses and operates the actuator 78 of the switch 77.

Now, the shaft 84 is moved by the knob 85 in the direction of the arrow as shown, operation of the switch 77 made by the lever 82 is discontinued to apply the current from the power source 74 in pulse fashion to the solenoid 42 to thus operate the solenoid 42 in pulse fashion. As a result, as mentioned above, the actuating member 37 is swung to engage the stopper lever 46 to change rotation of the capstan 20 from low speed to fast speed, and thus the running speed of the tape 17 is made from normal play speed to fast speed. When the shaft 84 is manually rotated until the pointer 86 points the digit "3", this shaft is gradually returned to its original position and the tape is driven at fast speed in the quantity corresponding to that driven at normal play speed for 3 minutes. Thereafter, the shaft 84 is completely returned to its original position where the pointer 86 points the digit "0". Upon returning the shaft to its initial position, the switch 77 is operated by the lever 82 to apply the current from the power source 79 to the solenoid 68 in pulse fashion to thus operate the latter in pulse fashion. Consequently, as described above, retention of the actuating member 37 is released to change rotation of the capstan 20 from fast speed to low speed and the running speed of the tape 17 is converted from fast to normal play speed.

More specifically, manual operation of the knob 85 automatically initiates the fast feed of the tape 17 and the tape is driven by quantity determined by the numeral of the digits on the dial plate 87 which the pointer 86 points whereby the fast feed of the tape automatically completed to change the running speed of the tape to normal play speed.

The resistors 76 and 81 functions to discharge the charge of the condensers 75 and 80.

Although the invention has been described with reference to specific embodiments, it is apparent that the invention is not to be limited to the embodiments as illustrated, and, accordingly, changes and variations may be made without departing from the spirit and scope of the invention as defined in the appended claims.

What is claimed is:

1. A magnetic tape fast feed control apparatus for an endless magnetic tape cartridge player, comprising a player deck, a rotatary capstan for driving the tape in the tape cartridge held in the play position, at least one magnetic head for transducing the tape, a retention member on the deck for urging a pinch roller, coactable with the capstan driving the tape, to a position where the pinch roller abuts against the capstan, comprising:

a motor as a drive source for rotating said capstan, said motor being arranged to selectively rotate its output shaft at either fast or low speed; a power circuit for the motor, said power circuit having a changing switch for selectively changing rotation of the motor from fast to low speed and vice versa;

large and small drive pulleys adjacent to each other connected to the output shaft of the motor; a belt for imparting rotation of the small and large drive pulleys to said capstan;

shift means for moving the belt to allow the latter to selectively be shifted to the small drive pulley or the large drive pulley, said shift means including an actuating member movably provided and engageable with the belt, a spring for urging said actuating member to a first position where the belt is trained to the small drive pulley, a solenoid for moving said actuating member against the bias of said spring to a second position where the belt is trained to the large drive pulley, and a control circuit for energizing said solenoid in pulse fashion, in response to movement of said actuating member from said first position to said second position, change-over of said changing switch being made to rotate the motor at fast speed while the belt is trained to the large drive pulley to rotate said capstan at fast speed thereby effecting the fast feed of the tape;

a stopper lever for retaining the actuating member which is moved to the second position by the solenoid in the second position;

moving means for moving said retention member in a condition that said pinch roller is away from said capstan and the drive of said tape is interrupted, said moving means having a moving lever movably provided on said deck and coupled to said retention member, and a lever driving device for reciprocally moving said moving lever, in response to reciprocal movement of said moving lever the drive of the tape being temporarily interrupted while the stopper lever is moved by said lever to a position where the stopper lever is disengaged from the actuating lever when said moving lever is moved whereby the actuating lever is returned to the first position to change rotation of said capstan to low speed and the drive of said tape is converted from fast speed to normal playing speed; control means for controlling operation of said driving device.

2. A magnetic tape fast feed control apparatus for an endless magnetic tape cartridge player in accordance with claim 1, wherein said magnetic head is mounted to a displaceable support member swingably provided on a pin mounted to said deck, the support member being normally biased by a spring member to a transduce position where said magnetic head transduces the tape, when said actuating member is moved from said first position to said second position the support member being moved against the bias of the spring member from the transduce position to the non-transduce position where said magnetic head is away from said tape.

3. A magnetic tape fast feed control apparatus for an endless magnetic tape cartridge player in accordance with claim 1, wherein said lever driving device in said lever moving means including as eccentric frictional wheel rotatably provided on said moving lever, a spring for biasing the moving lever in the direction where the wheel abuts against said capstan, a hook lever retaining the moving lever in the position where the wheel does not abut against said capstan against the bias of the spring, a solenoid for moving the hook lever to establish disengagement from the moving lever, and said control means including a control circuit for energizing the solenoid in pulse fashion, the wheel abutting against said capstan and being eccentrically rotated in response to energization of the solenoid thereby reciprocally moving the moving lever, the wheel being rotated through one revolution swingable movement of the moving lever being arrested by the hook lever while rotation of the wheel is automatically terminated.

4. A magnetic tape fast feed control apparatus for an endless magnetic tape cartridge player in accordance with claim 3, wherein said retention member is mounted to a leaf spring one end of which is fixed to said deck, said retention member being a roller which is insertable, under the bias of the leaf spring, into a notch formed on side wall of said cartridge in said play position.

5. A magnetic tape fast feed control apparatus for an endless magnetic tape cartridge player in accordance with claim 3, wherein said control circuit in said shift means and said control circuit in said lever driving device have a switch operable by a lever mounted to a shaft which is automatically rotated by a clockwork in one direction, the lever being manually rotated in the direction reversed to that in which the shaft in the original position for operating the switch, in response to this operation of the switch being discontinued and the solenoid of the shift means being operated in pulse fashion to fast feed the tape, the shaft being returned to the original position by the clockwork, in response to operation of the switch made by the lever the solenoid of the lever driving device being operated in pulse fashion to automatically terminate the fast feed of the tape thereby changing to the normal speed of the tape.

6. A magnetic tape fast feed control apparatus for an endless magnetic tape cartridge player in accordance with claim 5, wherein said shaft is provided with a pointer, a dial plate is provided in opposition to said pointer and having a plurality of digits designating the quantity of the tape to be fast fed, the shaft being manually controlled to determine the rotational volume thereof depending upon the dial plate which the pointer points to thereby determine the quantity of the tape to be fast fed, the tape being fast driven by the determined quantity, said switch being operated by said lever on the shaft thereby automatically terminating the fast feed of the tape.

* * * * *